INVENTOR
WILLIAM A. RAY
By Gordon H. Olson
ATTORNEY.

INVENTOR.
WILLIAM A. RAY
By Gordon H. Olson
ATTORNEY

Nov. 12, 1968  W. A. RAY  3,410,310
COMBUSTION VENTING SYSTEM
Filed June 30, 1966  3 Sheets-Sheet 3
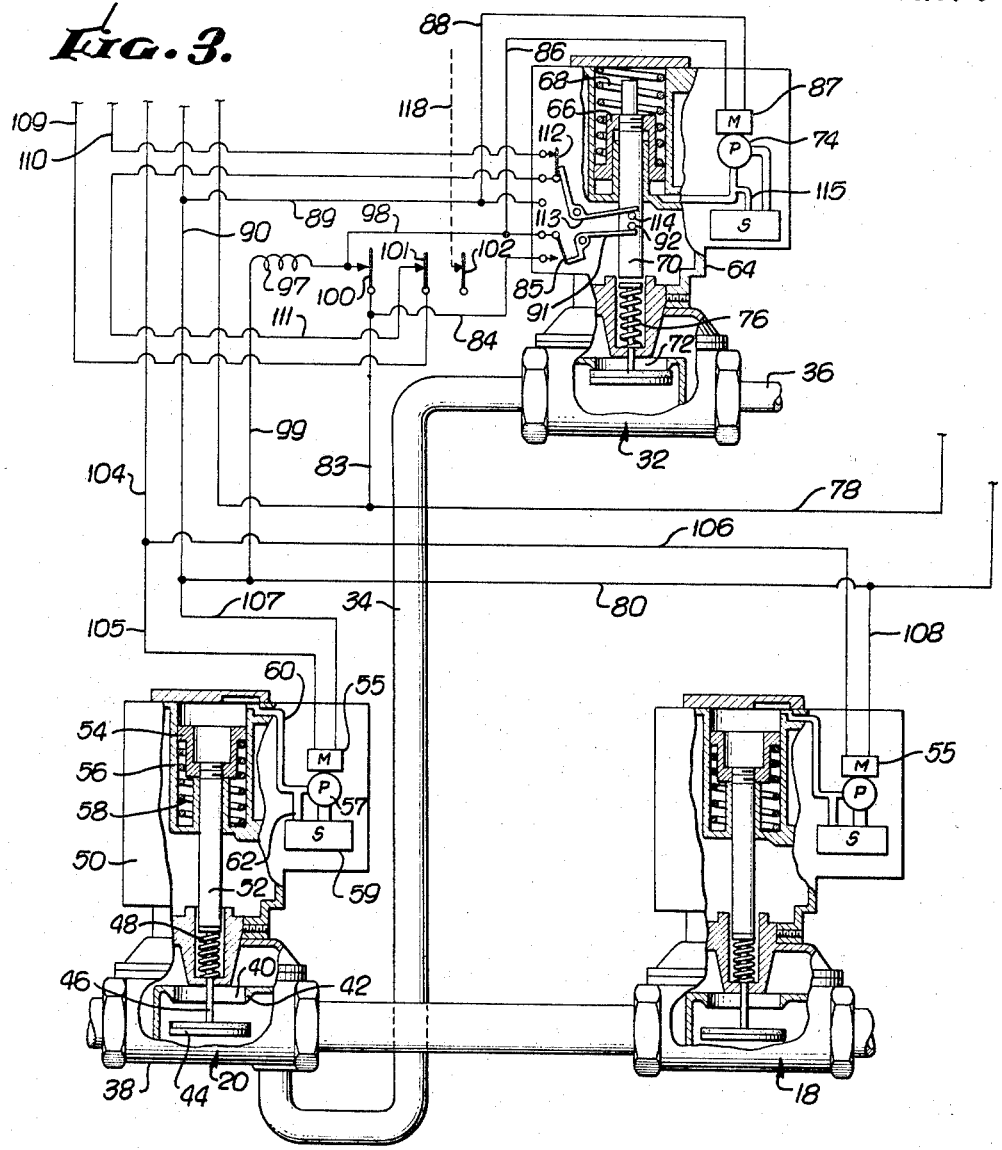
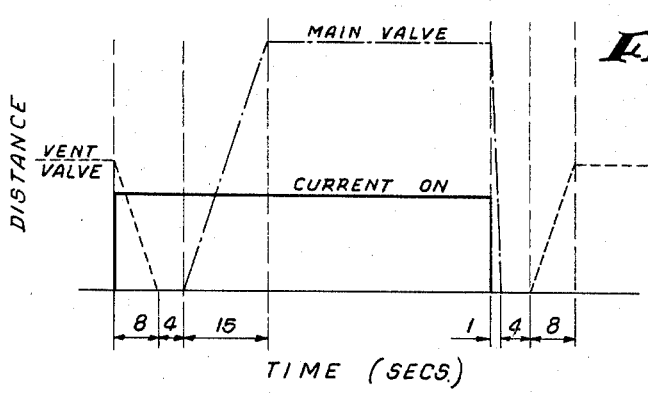
INVENTOR.
WILLIAM A. RAY
By Gordon H. Olson
ATTORNEY

United States Patent Office 3,410,310
Patented Nov. 12, 1968

3,410,310
COMBUSTION VENTING SYSTEM
William A. Ray, North Hollywood, Calif., assignor to International Telephone and Telegraph Corporation, New York, N.Y., a corporation of Maryland
Filed June 30, 1966, Ser. No. 562,159
6 Claims. (Cl. 137—627.5)

ABSTRACT OF THE DISCLOSURE

A fuel line is provided with a pair of hydraulically operated main valves and a vent valve located therebetween. Electric circuit and hydraulic sequence means control the valves such that the vent valve is closed first before the main valves are opened and the vent valve is not opened until the main valves have been closed.

---

Figure 1:
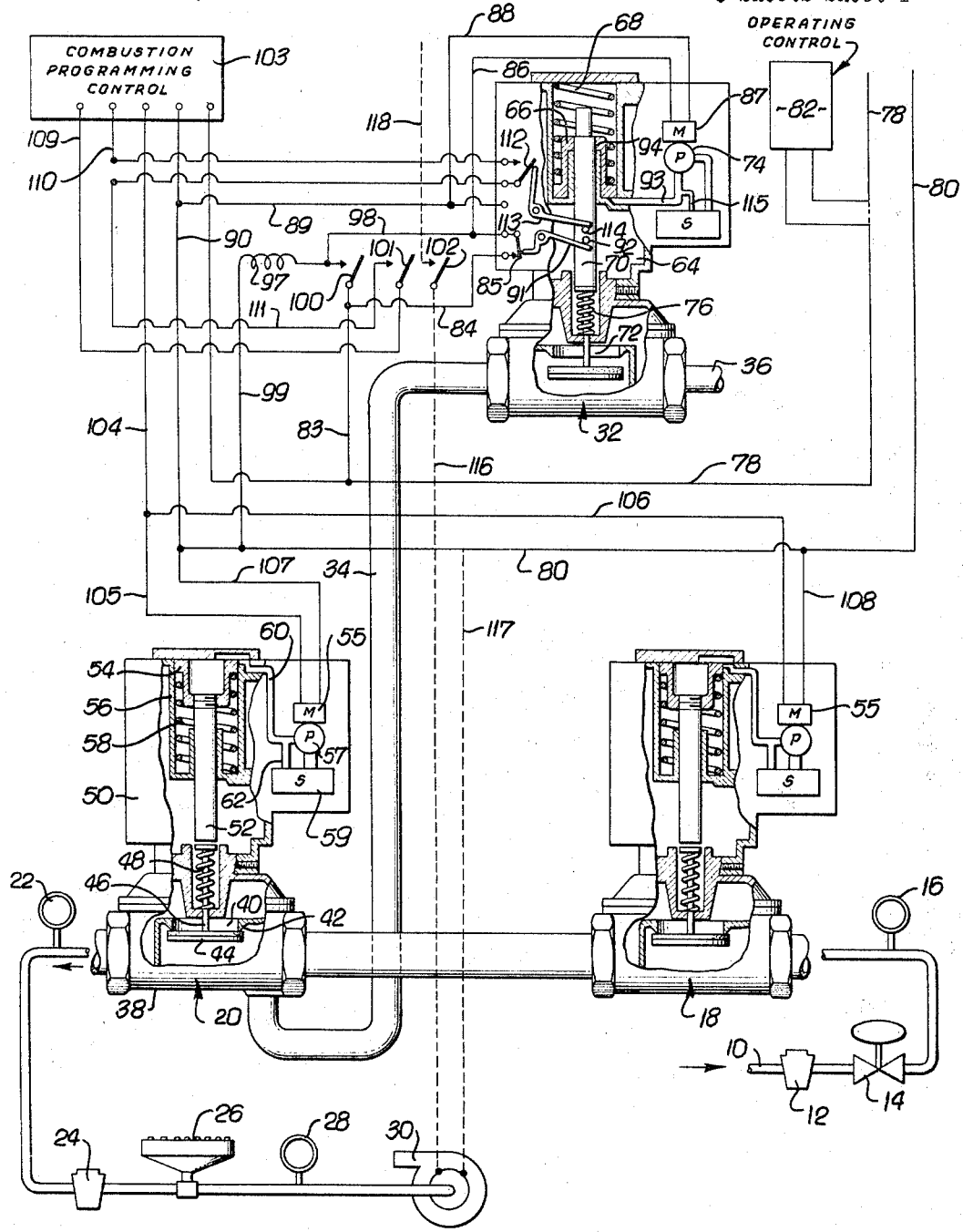

This invention relates to fuel burning equipment, and more particularly to a safety system for properly venting combustion gas and properly sequencing the opening and closing of fuel control valves and a vent valve during the beginning and closing stages of a combustion cycle.

Even though gaseous fuel valves are well designed and manufactured, it is exceedingly difficult to prevent all possibility of gas leakage. Hence, it is necessary in combustion systems to provide a safety arrangement to prevent a hazardous condition in the event there is a gas leakage. Because of this, in recent years, it has become common practice to include two main valves in the main fuel line leading to a burner so that both valves must be opened or closed during operation of the burner. Although such an arrangement naturally decreases the likelihood of gas leakage into the combustion chamber when the valves are closed, there is still the possibility of leakage. Moreover, in the event the valve closest to the burner should malfunction and remain open any leakage past the other valve escapes into the burner. To minimize this potential hazard a vent valve may be added to the system, connected between the two valves and atmosphere. As the main valves are opened the vent valve is closed. Similarly, after completion of a heating cycle, the main valves are closed and the vent valve opened so that any gas leaking past the upstream main valve escapes harmlessly to the atmosphere through the vent valve.

With such arrangement, unless positive control means are provided, the sequence of operation of these valves is unpredictable due to manufacturing variations and inaccuracies caused by wear. The desired sequencing of operation is that the vent valve be closed before the main valves are opened, at the beginning of a cycle, and that the main valves be closed before the vent valve is opened at the completion of a heating cycle. In the past, the operating speeds of these various valves has not been considered and the operation was erratic with the result that at the beginning of a cycle a main valve might open before the vent valve has closed so that a certain amount of gas leakage directly from the main gas line might escape to atmosphere. This, of course, is undesirable from a safety standpoint, and lowering of pressure in the gas line could have adverse effects. A similar condition might arise at the completion of a cycle wherein a vent valve opens before the main valves close. More seriously, if a vent valve should malfunction and not close properly, the conventional arrangements might result in an extremely dangerous situation if the main valves are allowed to open.

Accordingly, it is a primary object of this invention to provide an improved and safer operating gaseous combustion heating system.

It is a further object of this invention to provide a gas venting system for a combustion burner in which positive means are utilized to insure the proper opening and closing sequential operation of the various valves in the system.

Briefly stated, the invention includes a main gas line leading to a burner and having a pair of main valves serially connected in the gas line. A vent valve is also provided with one side connected to the main gas line between the two main valves and with its other side being open to atmosphere. The main valves are the normally closed variety, while the vent valve is of the normally open type. Means are provided connected to the main valve and controlled by movement of the vent valve for delaying the opening of the main valve until the vent valve has closed so that the main fluid flow cannot escape to the atmosphere. Hence, if for any reason the vent valve does not close, the main valves will remain closed. Upon completion of a heating cycle, the main valve is designed to quickly close prior to the opening of the vent valve so that again the possibility of main fuel flow directly to atmosphere is minimized.

Figure 2:
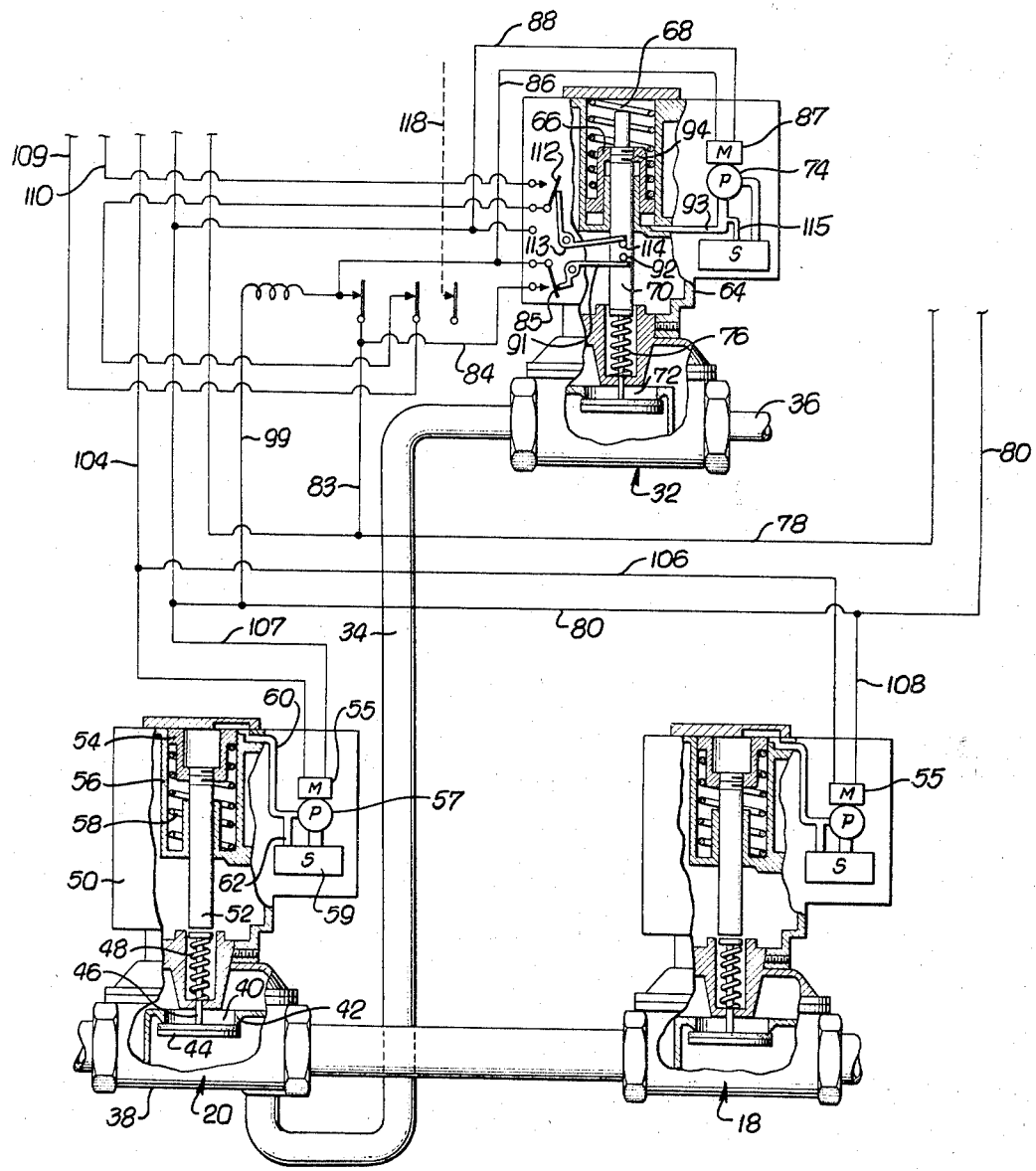

Further features, objects and advantages will become apparent with reference to the following description and drawing in which:

FIG. 1 is a diagrammatic illustration of the fuel system of the invention with the system not in operation, FIG. 2 is a view of a portion of the system of FIG. 1 at the beginning of a heating cycle, FIG. 3 is a view like FIG. 2 only with the system in operation; and FIG. 4 is a graphic illustration of the sequence of operation of the system of the invention.

Referring first to FIG. 1, the fuel system illustrated may be seen to include a main fuel line 10 having positioned therein a plug cock 12, a gas pressure regulator 14, a low gas pressure switch 16, a pair of main shut-off valve assemblies 18 and 20, a high gas pressure switch 22, a plug cock 24, a combustion burner 26, a low air pressure switch 28, and a fan or blower 30 for furnishing forced air to the burner. A vent valve assembly 32 is provided with its inlet connected by a conduit 34 to the main fuel line at a point between the main valve assemblies, and its outlet 36 open to atmosphere.

Since the main valve assemblies are identical, only one will be described and numbered in detail. Each assembly includes a housing 38 containing a valve 40 formed by a fixed valve seat 42 and a movable valve member 44 carried on a valve stem 46 which is normally urged by spring 48 into valve closing position.

The valve 40 may be opened by a self-contained hydraulic actuator assembly 50 which is mounted directly on housing 38. The actuator assembly includes an actuator rod 52 attached at its upper end to a piston 54 slidably mounted in a cylinder 56. As seen, piston 54 is urged upwardly by coil spring 58 and that in its upper position, actuator rod 52 is spaced slightly from valve stem 48 to insure that the valve 40 is closed in this position.

To force the piston 54 downwardly, there is provided within the actuator assembly an electric motor 55 driving a pump 57 which has its intake connected to a sump 59 containing a supply of hydraulic fluid. The pump output is ducted through a conduit 60 to a chamber on the top side of piston 54 so that when the motor is energized, the pressurized pump output forces the piston downwardly. In the arrangement illustrated, the pump is to run continuously when the valve 40 is to be open, and the excess output of the pump is ducted by bypass conduit 62 back to sump 59. When the pump stops, the bypass 62 permits the actuator piston to return to its upper position. The speed of operation of the actuator in both directions may be controlled by controlling the bypass flow rate, as will be later discussed in greater detail. It should be noted at this time, however, that the bypass flow may be controlled by an electrically operated valve or other means rather than simply by conduit size.

The vent valve assembly 32 and actuator assembly 64 are essentially the same basic construction as that of the main valve and actuator assemblies with the primary difference being that the piston 66 of the vent valve actuator is reversed so that spring 68 urges the piston and actuator rod 70 downwardly. Consequently, vent valve 72 is normally held in the open position when the actuator pump 74 is not in operation, it being understood that spring 68 produces a downward force greater than that of the valve opening upward force produced by valve spring 76.

As previously mentioned, two main valves are provided in the fuel line as opposed to just one as a safety precaution. In the event one fails, the other is likely to still function. Also, if fuel leaks past the first assembly 18 which is exposed to line pressure, assembly 20 will prevent further leakage into the fuel burner which could result in an explosive condition. As an additional precaution, vent valve 32 is provided to allow any fuel leaking past main valve assembly 18 to escape into the atmosphere rather than permitting it to remain in the fuel line where it could conceivably leak past assembly 20.

While the use of the three valves greatly reduces the likelihood of dangerous conditions arising, it is still possible for hazards to occur if the valves do not operate in the proper sequence.

The vent valve should be open when the main valves are closed, and closed when the main valves are open so that the main fuel flow is never open to atmosphere, but yet the leakage problem is accommodated. Hence, the most straight-forward approach might seen to be merely energize the actuators simultaneously and thereby presumably simultaneously operate the valves. However, due to the inherent speed of operation of the actuators and the valves and due to manufacturing tolerances, the desired sequencing may not be reliably obtained in this fashion.

For example, unless otherwise provided, a particular vent valve might operate slower than the upstream main valve; and hence, at the beginning of a heating cycle, the main fuel flow would escape to atmosphere for a short period of time. At the completion of a cycle, a slow operating vent valve would be desirable to insure that the main valves are closed before the vent valve opens. However, this should be positively planned rather than left to manufacturing variations.

In accordance with this invention, the valve and actuator assemblies and their interlocking electrical controls are uniquely arranged to insure that the desired sequencing is obtained. That is, the safety system of the invention operates such that the vent valve will not be open when the main valves are open. Basically, the interlocking circuitry of the system is arranged such that the vent valve actuator is energized first and movement of this actuator is used to control energization of the main valve actuators. Also, the vent valve actuator cannot be initially operated unless the vent valve is open since that is the normal non-operating position.

The circuitry includes input conductor 78 connected to a source of power and a common ground conductor 80. An operating control 82 in the input conductor 78 includes a thermostat, or other control device to indicate when heat is called for. As one circuit, conductor 78 is serially connected by conductors 83 and 84 to a safety switch 85 which is connected by conductor 86 to vent actuator motor 87 which is in turn connected to ground 80 by conductors 88, 89 and 90. Safety switch 85 is preferably normally inherently urged into an open position, but is movable into a closed position by the movement of vent actuator rod 70 through a suitable mechanical linking arrangement. For this purpose, a bell crank lever 91 is pivotally mounted in actuator 64 with one end in position to move switch 85 and the other end being movable by a pin 92 extending radially from actuator rod 70. As the rod is moved downwardly to the valve open position of FIG. 1, lever 91 is pivoted in a clockwise direction to close switch 85. Conversely, upward movement of rod 70 allows switch 85 to open.

Thus, it will be seen, that if the burner is off and the operating control 82 calls for more heat the cycle cannot be initiated unless vent valve 72 is open so that safety switch 85 is closed, which is the normal inoperative situation. Assuming safety switch 85 is closed as shown in FIG. 1 when the operating control is closed, motor 87 will be energized causing pressurized fluid to flow through conduit 93 to the underside of piston 94 to force the piston and rod 70 upwardly and valve 72 will close after the rod has moved a portion of its upward stroke, as shown in FIG. 2.

Simultaneously, with the energization of motor 87, a relay coil 97 connected in parallel with motor 87 by conductors 98 and 99 extending between conductor 86 and to ground 80 is energized. This causes normally open relay switches 100, 101 and 102 to close and remain closed while the coil is energized. Since switch 100 is in parallel with safety switch 85 by conductors 83 and 98, it serves to maintain motor 87 energized after safety switch 85 is opened upon movement of actuator rod 70 upwardly.

The main valve actuator motors 55 are connected in parallel to each other. However, rather than being directly connected to the power supply conductor 78 directly, there is provided a combustion programming control 103 which programs the combustion ignition means and any other operations to be coordinated with the initiation of combustion. Since the various functions to be performed by the control 103 do not form a major part of the inventive aspects of the safety system, the control will not be described in detail.

As shown, power input conductor 78 enters control 103 and conductor 104 connected to leads 105 and 106 connects the control 103 to main actuator motors 55. Conductors 107 and 108 connect the motors to ground 80. Also extending into control 103 are conductors 109 and 110 which serially connect relay switch 101, conductor 111 and a normally open safety switch 112 in vent valve actuator assembly 64. This safety circuit completes a connection in the control 103 between conductors 78 and 104 to permit the motors 55 to be energized. For purposes of understanding the circuitry the safety circuit including relay switch 101 and safety switch 112 could be connected directly between conductor 78 and the motors 55.

Returning to the operation of the system, when relay coil 97 has been energized closing relay switch 102, as seen in FIG. 2, the safety circuit including switch 112 is in position to be completed; however, switch 112 is still open. Further, upward travel of vent valve actuator rod 70 causes bellcrank lever 113 pivotally mounted on actuator assembly 64 to be pivoted in a counterclockwise direction, as viewed in the drawings, by interengagement of one end of lever 113 with pin 114 extending radially from rod 70. The opposite end of lever 113 is adapted to close switch 112 when the actuator rod 70 approaches its upper position, as seen in FIG. 3.

The closing of switch 112 completes the circuit through the programming control 103 to energize main actuator motors 55 with the result that the main actuators force the main valve actuator rod 52 downwardly to open the main valves 40 against the urging of springs 48 and 58.

Thus, the main valves will remain open so long as safety switch 112 and relay switch 101 are closed. Also, vent valve actuator rod 70 will remain in its upper position permitting vent valve 72 to remain closed. If the vent valve actuator should fail, the actuator rod 70 will move downwardly first opening safety switch 112 so that the main valve actuators will be deenergized.

The usual manner of terminating a heating cycle is for the operating control 82 to interrupt the main power supply. This naturally shuts-off the actuator motors and their output rods start to return to their "rest" position as determined by their respective piston return springs. Thus, the main valves start to close and the vent valve will start to open unless otherwise controlled. To prevent the possibility of the main fuel escaping to atmosphere, the vent valve must remain closed until the main valves are closed.

In accordance with a further aspect of the invention, the rates of operation of the hydraulic actuators are controlled to insure the desired sequencing of operation. As previously mentioned, the actuator motors 55 and 87 operate continuously when the actuator rods are held in their operated position. The rate at which these rods are moved to and from their operative positions is determined by the output of their pumps and by the amount of pressurized fluid bypassed to the pumps. To insure the proper sequencing of operation, the vent valve actuator is arranged to return relatively slowly to its unactuated position and the main valve actuators return quickly.

Accordingly, bypass 62 in the main valve actuator is made large relative to the output of sump 59. With a large bypass, the actuator rod 52 will move downwardly relatively slowly when the pump is operated and the rod will move upwardly relatively quickly when the pump ceases to operate, with the result that main valve 40 is opened slowly and closed quickly.

By contrast, vent valve is arranged to return to its "reset" position at a slower rate to insure that the vent does not open until the main valves have closed. The bypass conduit 115 for pump 74 is smaller with respect to the pump output than that for the main valve actuator assembly. Consequently, when the motor 87 is deenergized, the pressurized fluid holding the vent valve actuator piston 66 in its upper position is bled relatively slowly to the pump so that it takes longer for the vent valve to open than it does for the main valve to close.

The overall operation of the safety system of the invention can be more clearly understood by reference to FIG. 4, which graphically illustrates the operation of the system. When the operating control 82 applies power to the circuitry and the safety switch 85 is closed indicating that actuator rod 70 is in its lower position holding vent valve 72 open, the vent valve actuator motor 87 is energized. This point in time is indicated at the left hand edge of the graph.

The bypass rate for pump 74 indicated on the graph is selected such that it requires eight seconds for the actuator rod 70 to be forced upwardly a sufficient distance to allow vent valve 72 to close. This condition is indicated in FIG. 2. The actuator must move upwardly a further amount which takes about four seconds as shown on the graph, to cause lever 113 to close switch 112, as indicated in FIG. 3. This four seconds allows an additional safety factor to insure that the vent valve is closed. The vent valve actuator may be allowed to move upwardly a further additional amount to insure closing of the switch 112 until the rod 70 engages a suitable stop such as the end of the actuator cylinder. This slight additional travel is not shown on the graph at the beginning of the cycle, but may take about a second.

With the closing of switch 112, main actuator motors 55 are energized causing the main actuators to commence operation. Since the bypass of the main actuator is quite large relative to the pump output, it requires 15 seconds to open the main valves as shown on the graph. The system then remains in this condition until the current is shut-off by means of the operating control 82.

Upon interruption of the current, the actuator pumps cease to operate and the actuators return to their "rest" positions at a rate determined by their bypass conduits. Since the main actuator bypass is large relative to the amount of fluid involved, the pressure quickly collapses and the main valves are closed within one second.

It is now safe to open the vent valve. However, due to the smaller bypass in the vent valve actuator, an additional four seconds is required before the actuator rod 70 has moved downwardly to the point where it engages the valve stem of vent valve 72, as shown in FIG. 2. Eight additional seconds are required for the actuator rod 70 to complete its travel and completely open the vent valve.

Even with the various safety precautions heretofore described to prevent gas leakage into the combustion chamber, it may be desirable in some instances to purge the chamber with air prior to the initiation of combustion. The control system of the invention can accommodate this function by the dotted line circuit shown in FIG. 1 connecting fan 30 to relay switch 102 and ground 80 by conductors 116 and 117. Conductor 118 leads to a source of power (not shown) so that the fan 30 energized upon closing of switch 102, which takes place at the beginning of the cycle. Thus, with the arrangement illustrated by the graph of FIG. 4, the fan 30 can operate for twelve seconds to purge the chamber before the main valves are opened.

Thus, it can be seen from the foregoing that a unique, positive control system has been disclosed to insure safe operation of a fuel burner. It should, of course, be understood that the operating parameters of the valves and actuators may be selected as desired and that the arrangements shown are merely illustrative. Similarly, the mechanical means for controlling the safety switch in the vent valve actuator can be provided in various forms. Other changes and modifications will become apparent in the light of this disclosure; and accordingly, it is intended that all such modifications that fall within the true spirit and scope of the invention be included in the appended claims.

What is claimed is:

1. A fuel flow safety venting system comprising:
   conduit means forming a main fuel line;
   a pair of main valves serially connected in said line for controlling flow therethrough;
   actuator means for operating said main valves;
   a vent valve having an inlet connected to said main line between said main valves and an outlet open to atmosphere;
   actuator means for operating said vent valve;
   means interlocking said main valve and vent valve actuator means controlled by movement of said vent valve for operating said main valve actuator means to open said main valves only while said vent valve is closed so that the main fuel flow does not escape to atmosphere, said interlocking means including an electric switch for controlling energization of said main valve actuator means, said switch being closed by said vent valve actuator means after the latter has closed the vent valve.

2. The system of claim 1 in which said sequence means includes said main valve actuator means being adapted to cause the main valves to quickly close when deenergized, and said vent valve actuator being adapted to operate slowly such that the vent valve opens upon deenergization of the main valve and vent valve acutator means only after the main valves have closed.

3. The invention of claim 1 in which said vent valve includes a movable valve member mounted on a stem, a compression spring surrounding said stem and urging the valve member into closed position, said vent valve actuator includes an actuator shaft engageable with said valve stem, spring means urging said shaft against said valve stem when the actuator is unenergized, said shaft being axially movable away from said stem when the actuator is energized to permit the vent valve to close under the urging of the vent valve spring and then after further movement to operate said switch and hence said main valve actuator means.

4. The invention of claim 1 in which each of said actuator means includes a hydraulically driven actuator supplied pressurized fluid by an electrically driven pump, said sequence means includes said main valve pump and actuator including pressure relief means which permit the pressure on the main valve actuator to quickly collapse upon deenergization of said main valve pump, and said vent valve pump and actuator including pressure relief means which permits the pressure on the vent valve actuator to be reduced at a rate slower than that of said main pressure relief means upon deenergization of said vent valve pump.

5. The invention of claim 1 in which said interlocking means includes electrical control circuitry for controlling the energization of said valve actuator means comprising a first circuit serially connecting said vent valve actuator means and a second switch to a source of power, said second switch being held in closed position by said vent valve actuator means when said vent valve is open and being allowed to open when said vent valve is closed, and a second circuit serially connecting said main valve actuator means to said first mentioned switch, said second circuit being connected to said power source in parallel with said first circuit, said first mentioned switch being movable to closed position by said vent valve actuator means after said vent valve actuator means has closed said vent valve, whereby main valve actuator means can be energized only after said vent valve actuator means has been first energized to close said vent valve.

6. The invention of claim 5 in which said circuitry further includes a relay coil and a relay switch with the coil connected to be energized when said first circuit is energized through said closed second switch to thereby close the relay switch which is in parallel with said second switch so that said vent valve actuator means will remain energized to maintain said vent valve closed when said main valve actuator means are energized.

References Cited
UNITED STATES PATENTS 3,358,732  12/1967  Stuart _____ 158—11

FREDERICK L. MATTESON, Jr., *Primary Examiner.*

E. G. FAVORS, *Assistant Examiner.*